United States Patent [19]

Bergmans et al.

[11] Patent Number: 4,953,183
[45] Date of Patent: Aug. 28, 1990

[54] ARRANGEMENT FOR COMBATTING INTERSYMBOL INTERFERENCE AND NOISE

[75] Inventors: Johannes W. M. Bergmans, Eindhoven, Netherlands; Yau Cheung Wong, Hong Kong, Hong Kong

[73] Assignee: U.S. Philips Corp., New York, N.Y.

[21] Appl. No.: 143,913

[22] Filed: Jan. 13, 1988

[30] Foreign Application Priority Data

Jan. 20, 1987 [NL] Netherlands ................. 8700125

[51] Int. Cl.$^5$ .............................................. H04B 1/10
[52] U.S. Cl. ......................................... 375/101; 375/14
[58] Field of Search ........................ 375/99, 101–103, 375/11, 12, 14; 333/18

[56] References Cited

U.S. PATENT DOCUMENTS

| | | | |
|---|---|---|---|
| 3,974,449 | 8/1976 | Falconer | 375/14 |
| 4,021,738 | 5/1977 | Gitlin et al. | 375/14 |
| 4,288,872 | 9/1981 | Tamburelli | 375/14 |
| 4,412,341 | 10/1983 | Gersho et al. | 375/102 |
| 4,577,330 | 3/1986 | Kavehrad | 375/102 |
| 4,615,038 | 9/1986 | Lim et al. | 375/14 |

OTHER PUBLICATIONS

E. Bigliere et al, "Adaptive Cancellation of Nonlinear Intersymbol Interference for Voiceband Data Transmission", IEEE Journal on Selected Areas in Communications, vol. Sac-2, No. 5, Sep. 1984, pp. 765–777.
M. S. Mueller et al, "A Unified Theory of Data-Aided Equalization", The Bell System Technical Journal, vol. 60, No. 9, Nov. 1981, pp. 2023–2038.
K. Wesolowski, "On the Performance and Convergence of the Adaptive Canceller of Intersymbol Interference in Data Transmission", IEEE Transactions on Communications, vol. Com-33, No. 5, May 1985, pp. 425–432.

Primary Examiner—Douglas W. Olms
Assistant Examiner—Marianne Huseman
Attorney, Agent, or Firm—Emmanuel J. Lobato

[57] ABSTRACT

Apparatus for combatting intersymbol interference and noise introduced into a data signal transmitted at a symbol rate 1/T by a transmission channel having a memory span LT corresponding to a number of L consecutive data symbols, comprises a receive filter (RF), a first decision circuit (ID) for forming preliminary symbol decisions in response to the transmitted data signal, a second decision circuit (FD) for forming final symbol decisions, means (FFS and FBS) for compensating pre- and post-cursive intersymbol interference, and a combining circuit (AD) for forming the input signal for the second decision circuit (FD). By selecting in these compensating means the memory span MT of the feedforward section (FFS), and possibly also the memory span NT of the feedback section (FBS), to be smaller than the memory span LT of the transmission channel, a simplification of the implementation of the arrangement is achieved, whereas the attainable transmission quality does not appreciably differ from the transmission quality attainable with MT=NT=LT.

10 Claims, 3 Drawing Sheets

ARRANGEMENT FOR COMBATTING INTERSYMBOL INTERFERENCE AND NOISE

BACKGROUND OF THE INVENTION

1. Field of the Invention

The invention relates to an apparatus for combatting intersymbol interference and noise introduced into a data signal transmitted at a symbol rate 1/T by a transmission channel having a memory span LT corresponding to a number of L consecutive data symbols, which apparatus comprises:

a receive filter for forming a delayed version of the transmitted data signal and for suppressing noise therein; a first decision circuit for forming preliminary symbol decisions in response to the transmitted data signal;

a second decision circuit for forming the final symbol decisions;

compensating means comprising a feedforward section for forming a first compensating signal for pre-cursive intersymbol interference in response to a number of consecutive preliminary symbol decisions, and a feedback section for forming a second compensating signal for post-cursive intersymbol interference in response to a number of consecutive final symbol decisions; and a combining circuit for forming an input signal for the second decision circuit for the delayed and filtered version of the transmitted data signal and the sum of the first and second compensating signals.

2. Related Art

Such an arrangement is known from an article entitled "Adaptive Cancellation of Nonlinear Intersymbol Interference for Voiceband Data Transmission" by E. Biglieri et al., published in IEEE Journal on Selected Areas in Communications, Vol. SAC-2, No. 5, Sept. 1984, pp. 765–777, in particular FIG. 7 and the associated description. This article describes several implementations of arrangements for combatting both linear and non-linear intersymbol interference as well as noise in data signals.

The implementation shown in FIG. 7 of this article relates to a non-linear canceller in which noise is suppressed by using a receive filter in the form of a so-called Matched Filter, whose impulse response is the time-reverse of that of the transmission channel, and in which it is attempted to cancel intersymbol interference by synthesizing a copy of it and substracting this copy from the output signal of the matched filter. From this article it appears that the memory span of the feedforward section as well as the feedback section has to be equal to that of the transmission channel to achieve the optimum transmission quality.

This conclusion also follows from an article entitled "A Unified Theory of Data-Aided Equalization" by M. S. Mueller and J. Salz, published in Bell System Technical Journal, Vol. 60, No. 9, Nov. 1981, pp. 2023–2038, in which theoretical considerations are devoted to techniques for simultaneously combatting intersymbol interference and noise. In this article, the occurring intersymbol interference is assumed to be linear and the symbol decisions applied to the compensating means are assumed to be without errors, and the arrangement is optimized according to a criterion for minimizing the mean-square error. Mueller and Salz likewise conclude that a degradation of the transmission quality is bound to occur if the memory span of the feedforward section or feedback section is selected to be smaller than that of the transmission channel. However, in practice, the symbol decisions applied to the compensating means are not without errors. The effects of these erroneous symbol decisions on the final symbol decisions, a phenomenon denoted as error propagation, leads to a degradation of the transmission quality. This clearly appears from an article entitled "On the Performance and Convergence of the Adaptive Canceller of Intersymbol Interference in Data Transmission" by K. Wesolowski, published in IEEE Transactions on Communications, Vol. COM-33, No. 5, May 1985, pp. 425–432, which reports on measurements of error probabilities in the final symbol decisions for the arrangement considered here, which measurements were obtained for different transmission channels, the respective memory spans of the compensating means each time being selected so as to be equal to that of the transmission channel.

Despite the fact that in the articles by both Wesolowski and Biglieri et al, the detrimental effects of error propagation are recognized, neither of these articles provides a solution to this problem.

SUMMARY OF THE INVENTION

The invention has for its object to provide an arrangement of the type mentioned in the preamble, in which the said error propagation is considerably reduced and a simplification of the implementation is achieved at the same time.

An arrangement according to the invention is characterized in that the feedforward section of the compensating means has a memory span MT corresponding to a number of M preliminary symbol decisions which is smaller than the memory span LT of the transmission channel; and in that the combination of the receive filter and compensating means are arranged for minimizing a predetermined function of an error signal representative of the difference between the input signal of the second decision circuit and the final symbol decisions.

The intended reduction of error propagation results from a reduction of the memory span MT of the feedforward section with respect to the prior art value of the memory span MT=LT, where LT is the memory span of the transmission channel, because erroneous preliminary symbol decisions are now exercising their influence on the final symbol decisions over a shorter time interval. According to the article by Mueller and Salz, the proposed reduction leads, true enough, to a degradation of the optimum signal-to-noise ratio because the receive filter now also has to suppress the intersymbol interference outside the span of the feedforward section, but the effect of this degradation on the transmission quality is largely or even completely counteracted by the achieved reduction of error propagation. Experiments have shown that the latter holds for strongly reduced memory spans MT, in many cases even for values of M=2 or M=1. Thus, a larger freedom is obtained in selecting the memory span MT of the feedforward section. Owing to the proposed measure, the overall delay between input and output of the arrangement can likewise be reduced to a minimum value MT, whereas no smaller value than LT is possible in the prior art arrangements.

A further simplification of the implementation of an arrangement according to the invention is possible by likewise selecting the memory span NT of the feedback section of the compensating means to be smaller than the transmission channel memory span LT. According to the article by Mueller and Salz, this reduction too will lead to a degradation of the optimum signal-to-noise ratio because the receive filter now also has to suppress intersymbol interference outside the span of the feedback section. Its adverse effect on the transmission quality is counteracted by the reduced effect of erroneous final symbol decisions applied to the feedback section, but now to a much lesser extent than in the case of the feedforward section because these final symbol decisions are of better quality than the preliminary symbol decisions. For keeping the transmission quality of the arrangement virtually unaffected at its optimum level, the memory span NT of the feedback section can thus be reduced less than the memory span MT of the feedforward section.

Both said reductions make it attractive to use table-lookup memories when implementing the compensating means, as the extent of these memories exponentially decreases with the respective memory spans of the compensating means. An additional advantage of the use of table-lookup memories is their intrinsic capability to compensate for non-linear intersymbol interference as well.

The invention provides the advantage that the optimization of the ensemble of receive filter and compensating means can be performed by using techniques known per se, both in the case of a non-adaptive implementation of the ensemble (as described in the article by Mueller and Salz) and in the case of an adaptive implementation, in which latter case use can be made of adaptation algorithms known per se.

Generally the first decision circuit can be arranged in any way conventionally used to form final symbol decisions. The quality of the preliminary symbol decisions can be improved by implementing this first decision circuit in turn as an arrangement according to the invention and using the final symbol decisions produced thereby as preliminary decisions in the proper arrangement according to the invention. Such an embodiment can be simplified by using the receive filter of the proper arrangement as the receive filter in the first decision circuit as well. A further simplification can be achieved in this case in that during each symbol interval T the feedforward section, the feedback section, the combining circuit and the second decision circuit are first used for obtaining preliminary symbol decisions and are subsequently used for obtaining final symbol decisions in response to the preliminary symbol decisions thus obtained.

BRIEF DESCRIPTION OF THE DRAWING

The invention will further be explained with reference to the drawings, in which.

DETAILED DESCRIPTION OF THE PREFERRED EMBODIMENT

Figure 1:
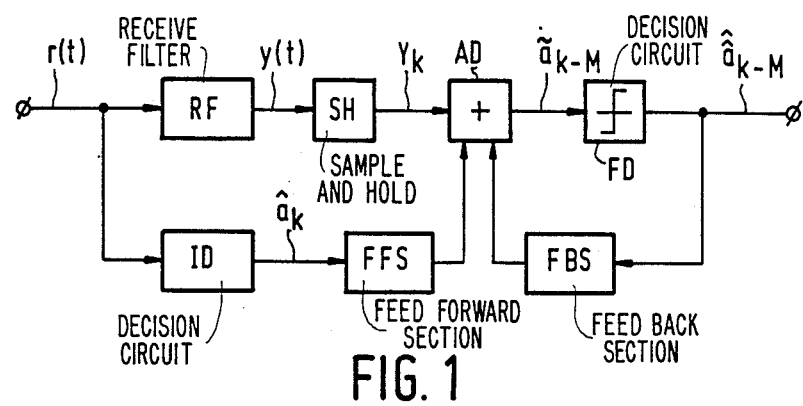
FIG. 1 shows a block diagram of a conceptual embodiment of an apparatus according to the invention for combatting intersymbol interference and noise.

FIG. 1 shows a conceptual embodiment of an apparatus in accordance with the invention for combatting intersymbol interference and noise. The configuration of this arrangement corresponds to that of FIG. 7 of the aforesaid article by Biglieri et al. Such an arrangement comprises a receive filter RF connected on its input side to the output of a transmission channel (not shown) having an impulse response f(t) for transmitting a data signal $a_k$ at a symbol rate 1/T. During this transmission additive Gaussian noise n(t) is introduced so that the input signal of the receive filter can be described as:

$$r(t) = \sum_{k=-\infty}^{\infty} a_k f(t - kT) + n(t) \tag{1}$$

In a transmission channel having a memory span LT the signal r(t) is, at any instant t, completely determined by L consecutive terms in this sum. From this signal r(t) the receive filter RF produces a filtered version y(t), in which the noise is suppressed as well as possible, and this signal y(t) is applied to a sample-and-hold circuit SH for obtaining the sampled version $y_k = y(kT)$ of y(t) that is sampled at a rate 1/T. In addition, the receive filter RF introduces a signal delay MT large enough to form a number of M preliminary symbol decisions $\hat{a}_{k-M+1} \ldots \hat{a}_k$ in response to the received signal r(t) by means of a first decision circuit ID likewise connected to the input of this receive filter RF. The arrangement also comprises a second decision circuit FD for forming the final symbol decisions $\hat{a}_{k-M}$, and compensating means comprising a feed-forward sectin FFS for forming a first compensating signal for pre-cursive intersymbol interference in response to a number of M consecutive preliminary symbol decisions $\hat{a}_k \ldots \hat{a}_{k-M+1}$, a feedback section FBS for forming a second compensating signal for post-cursive intersymbol interference in response to a number of N consecutive final symbol decisions $\hat{a}_{k-M-1} \ldots \hat{a}_{k-M-N}$, and a combining circuit AD for forming an input signal $\bar{a}_{k-M}$ for the second decision circuit FD from a delayed, filtered and sampled version $y_k$ of the transmitted data signal r(t) and the sum of the first and second compensating signals.

When optimizing in such an arrangement the ensemble of receive filter RF, feedforward section FFS and feedback section FBS according to a method known per se, for example on the basis of minimizing the mean-square value $\epsilon$ of the difference $\bar{a}_{k-M} - \hat{a}_{k-M}$ between the input signal of the second decision circuit FD and the final symbol decisions, compare the above article by Mueller and Salz, it appears that in accordance with the invention the memory span MT of FFS, as well as the memory span NT of FBS, can be selected to be smaller than the memory span LT of the transmission channel, without these reductions appreciably affecting the transmission quality. More specifically, for many transmission channels used in practice and having, for example L=10-15, it appears that a dimensioning with, for example, M=2 and N=4 results in an attainable transmission quality that is hardly inferior to the quality to be attainable with M=N=L, in which latter case the receive filter RF degenerates to a matched filter. When dimensioned in accordance with the invention, the receive filter also has the function of canceller of intersymbol interference outside the common span of the feedforward and feedback sections, in addition to the functions of signal delay and noise suppressor stated above. This additional task, though, is accompanied by a certain degradation of the realized noise suppression, but this degradation is largely or even completely counteracted in that the reduction of the memory span MT of the feedforward section FFS results in that erroneous preliminary symbol decisions now exercise their influence on the final symbol decisions for a period, which is less long, resulting in reduced error propagation. Such a trade-off between reduced error propagation and degraded noise suppression is likewise possible when reducing the memory span NT of the feedback section FBS, but this trade-off is less effective as the quality of the applied final symbol decisions is better than that of the preliminary symbol decisions applied to the feedforward section FFS.

The proposed reduction of the memory spans MT and NT of the feedforward and feedback sections FFS and FBS results in a simplification of their implementation. In addition, the overall signal delay of the arrangement can be reduced to a minimum value MT.

Generally the first decision circuit ID can be arranged in any way conventionally used for forming final symbol decisions. Such a decision circuit preferably comprises a so-called Decision Feedback Equalizer (DFE), as described in the aforesaid article by Wesolowski.

Figure 2:
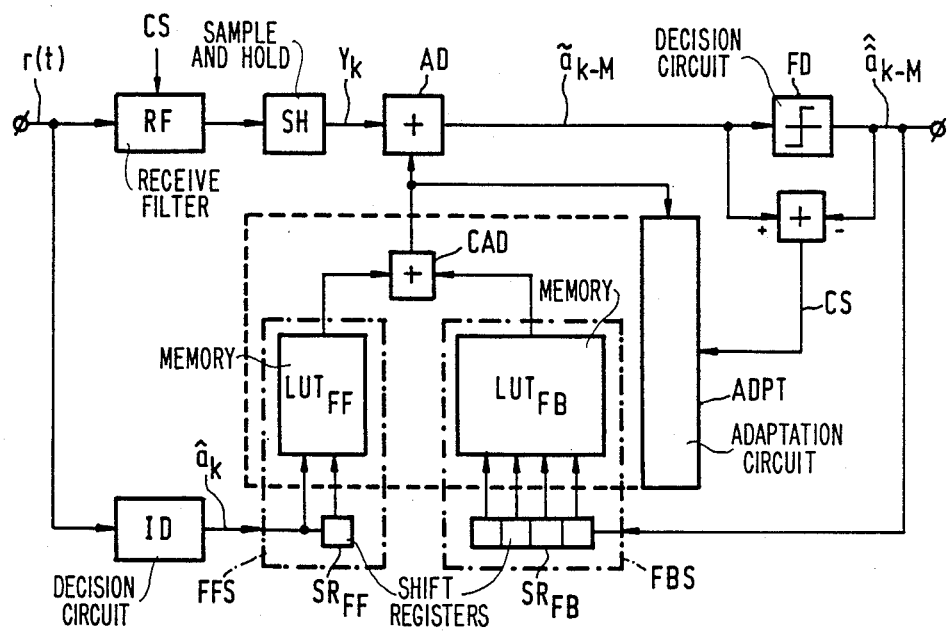
FIG. 2 shows a block diagram to illustrate an embodiment of an apparatus according to the invention.

The block diagram shown in FIG. 2 is illustrative of an embodiment of the invention, in which the feedforward section FFS and the feedback section FBS are implemented by means of table-lookup memories. Thereto the two sections FFS and FBS comprise a shift register $SR_{FF}$ and $SR_{FB}$, respectively, which are clocked at the symbol rate 1/T and to which the respective preliminary and final symbol decisions are applied. The elements of these shift registers $SR_{FF}$ and $SR_{FB}$ are connected to the address lines of the respective table-lookup memories $LUT_{FF}$ and $LUT_{FB}$ that are realized as random access memories (RAM) in this case. The samples of the first and the second compensating signals are stored in these memories as a function of the M preliminary and N final symbol decisions $\hat{a}_k \ldots \hat{a}_{k-M+1}$ and $\hat{\hat{a}}_{k-M-1} \ldots \hat{\hat{a}}_{k-M-N}$, respectively, and the sum of these signals is formed by means of an adder CAD and is applied to the combining circuit AD. The values for M and N used in FIG. 2 are 2 and 4, respectively. Filling these memories can be adaptively performed by means of an adaptation circut ADPT, to which the sum of the compensating signals as well as the error signal derived from the second decision circuit FD and $\bar{a}_{k-M} - \hat{\hat{a}}_{k-M}$ denoted CS in FIG. 2, are applied as input signals. Adaptation algorithms applicable hereto and their implementations are known per se and do not need further explanation. Such algorithms can likewise be used to adjust the receive filter RF adaptively in response to the same error signal CS, as shown symbolically in FIG. 2. The size of the memories $LUT_{FF}$ and $LUT_{FB}$ is exponentially proportional to the respective numbers M and N of the respective preliminary and final symbol decisions used for their addressing. Compared to the known dimensioning of the apparatus, in which both M and N are selected to be equal to the number 4 of symbols corresponding to the memory span LT of the transmission channel, having typical values L=10-15, the span-reduction in accordance with the invention will indeed result in a drastic reduction of the size of the two memories. Evidently, with the small values of M and N according to the invention, it is attractive to combine the two memories into one memory in which samples are stored of the sum of the first and second compensating signals. This will also lead to the omission of adder CAD.

Figure 3:
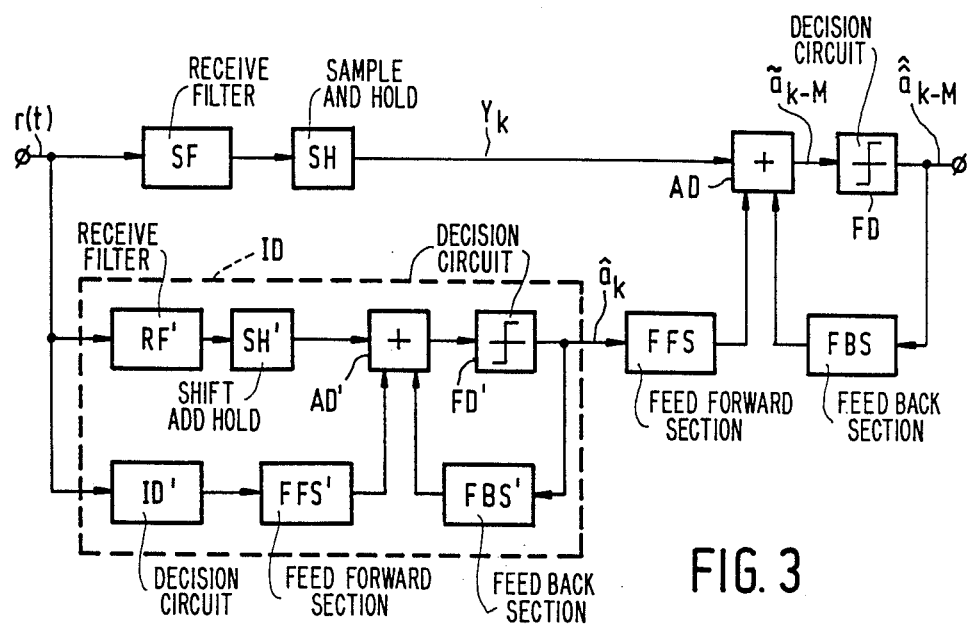
FIG. 3 shows a block diagram to illustrate a nested embodiment of an apparatus according to the invention.
Figure 4:
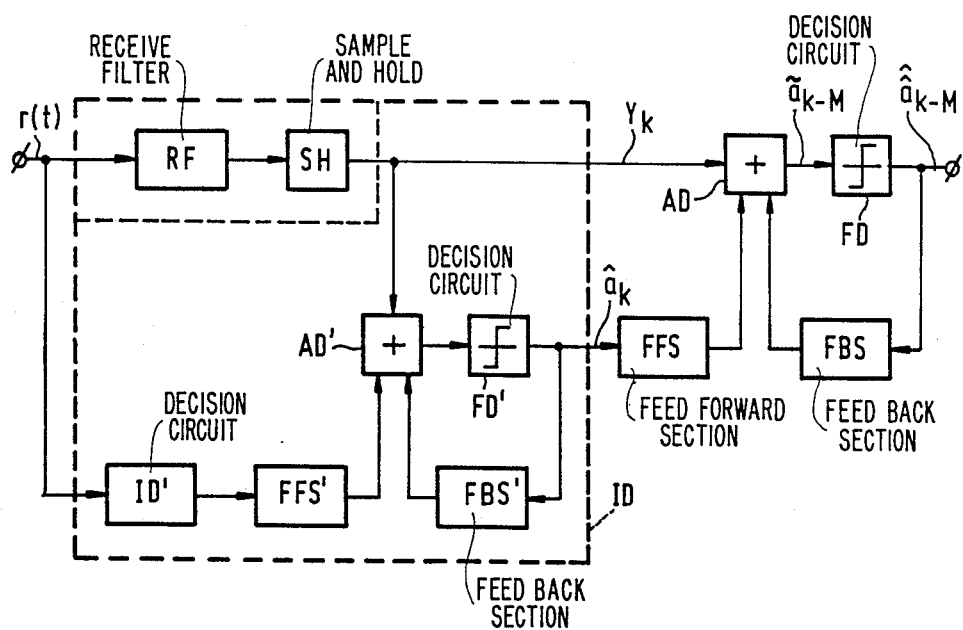
FIG. 4 shows a block diagram of a simplified variant of the embodiment shown in FIG. 3.

The quality of the preliminary symbol decisions and hence the quality of the final symbol decisions can be improved by realizing the first decision circuit ID in its turn as an arrangement in accordance with the invention, having a configuration as shown in FIG. 1 and using the final symbol decisions formed thereby, as preliminary symbol decisions in the arrangement proper. Such a "nested" structure is shown in FIG. 3. The rectangular box ID, shown in FIG. 3 by a dashed line, encloses a configuration that is identical to the configuration according to FIG. 1 and corresponding elements inside this box are denoted by the same reference symbols, but now provided with a prime ('). Further "nesting" is possible indeed, but this will usually not lead to significant improvements of the quality of the final symbol decisions. The implementation of a "nesting" structure in accordance with FIG. 3 can be simplified by using the receive filter RF of the proper arrangement also as receive filter RF' in the first decision circuit ID. This simplified version of FIG. 3 is shown in FIG. 4, in which also the sample-and-hold circuit SH is used in common.

Figure 5:
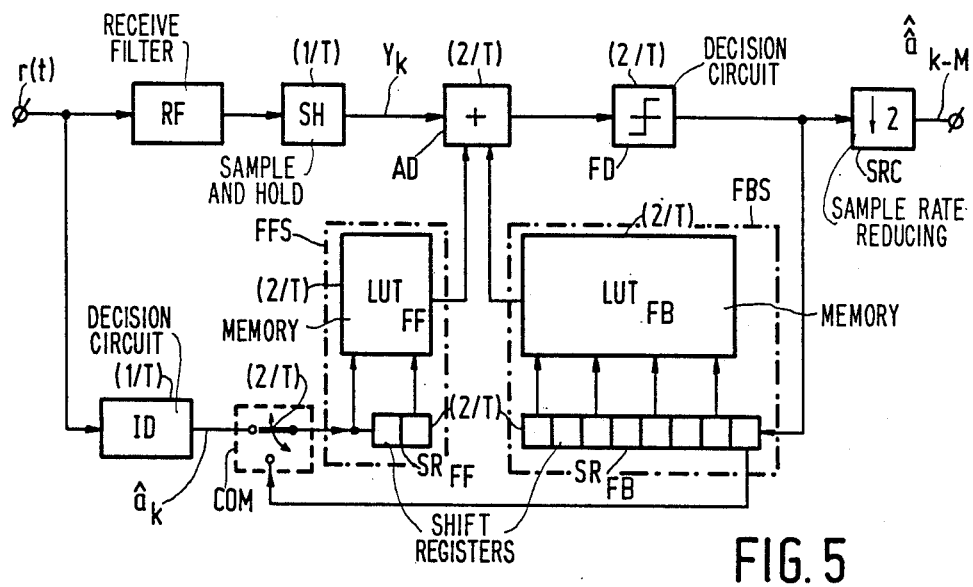
FIG. 5 shows a block diagram of an apparatus derived from an arrangement shown in FIG. 4, wherein the compensating means as well as the combining circuit and the second decision circuit are alternately involved in forming preliminary symbol decisions and final symbol decisions on the basis of time-division.

Since it applies to the two feedforward sections FFS and FFS' as well as to the two feedback sections FBS and FBS' that they can be chosen so as to be identical as regards both structure and dimensioning, there is the possibility to use one and the same combination of feedforward and feedback sections during each symbol interval T, first for obtaining preliminary symbol decisions and subsequently for obtaining final symbol decisions in response to the preliminary symbol decisions thus obtained. An arrangement illustrating such implementation is schematically shown in FIG. 5. Corresponding elements in FIG. 2 and FIG. 5 are denoted by the same reference symbols. The output of the first decision circuit ID in FIG. 5 is connected to a change-over switch COM, changed-over at a rate 2/T such that the input of the shift register $SR_{FF}$ of the feedforward section is connected to the output of the first decision circuit ID during the first half of each symbol interval T and then receiving preliminary symbol decisions, and is coupled to the output of the second decision circuit FD during the second half of each symbol interval T and then receiving the final symbol decisions formed during the first half as preliminary symbol decisions of improved quality. In order to realize in FIG. 5 the "nesting" operation set out in FIG. 4, the shift registers $SR_{FF}$ and $SR_{FB}$, the memories $LUT_{FF}$ and $LUT_{FB}$, the combining circuit AD and the second decision circuit FD operate at the double symbol rate 2/T, so that in the first half of each symbol interval T a final symbol decision occurs at the output of the second decision circuit FD which is used as a preliminary symbol decision during the second half of the symbol interval. The final symbol decision obtained thus in the second half is transferred to the output of the arrangement by means of a sampling rate reducing circuit SRC (also known as sampling rate compressor) during a complete symbol interval T. The shift register $SR_{FB}$ having the length of 2N=8 alternately contains final and preliminary symbol decisions, the outputs of the second, fourth, sixth and eighth element acting as address lines for the table-lookup memory $LUT_{FB}$. Consequently, this memory is addressed by preliminary symbol decisions during the first half of each symbol interval T, and by final symbol decisions during the second half. The output of the first element of the shift register $SR_{FB}$ is connected to that input of the change-over-switch COM which, during the second half of each symbol interval T, is connected to the shift register $SR_{FF}$ of the length $2(M-1)=2$, in which the input of the first element and the output of the second element act as address lines for the table-lookup memory $LUT_{FF}$. Hence during the second half of each symbol interval T this memory is thus addressed by the final symbol decisions obtained during the first half, whilst the position of the change-over switch COM shown in FIG. 5 for the first half sees to it that addressing then exclusively takes place on the basis of preliminary symbol decisions produced by the first decision circuit ID.

Figure 6:
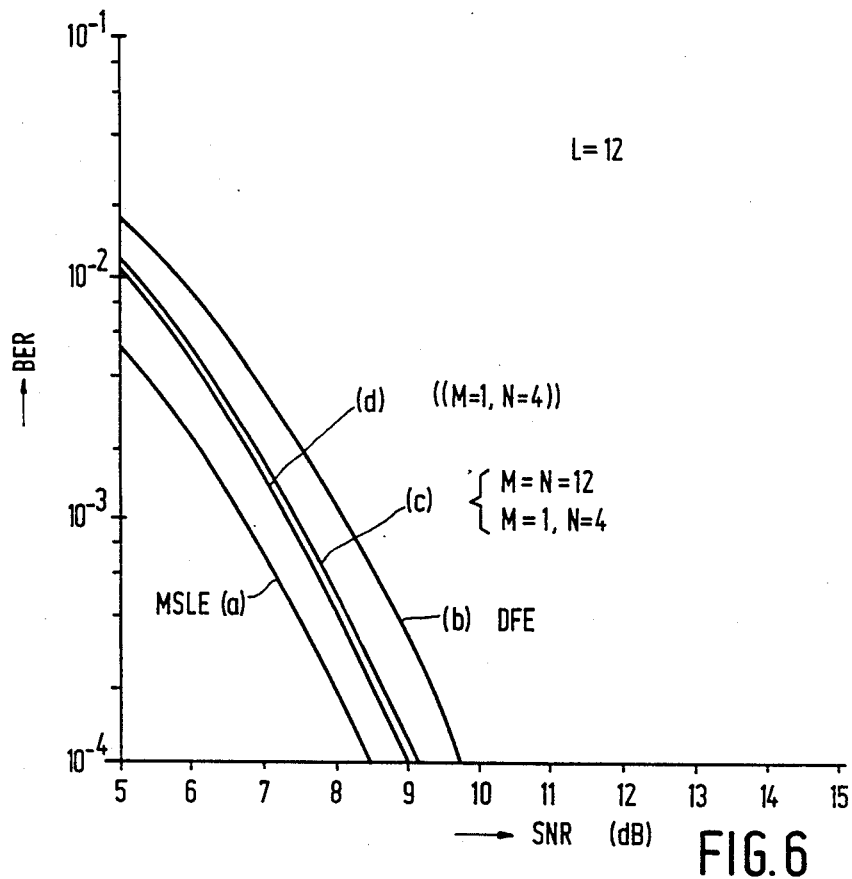
FIG. 6 shows a set of graphs to illustrate the transmission quality attainable with an apparatus according to the invention and with other similar arrangements.

To illustrate the transmission quality attainable with an arrangement in accordance with the invention. FIG. 6 shows a set of graphs obtained by simulation for a transmission channel having L=12, which is representative of a digital magnetic recording system in which binary data symbols $a_k$ are used. These graphs show the probability of erroneous final symbol decisions, in this case the bit error rate (BER), as a function of the signal-to-noise ratio (SNR) at the output of the transmission channel for an arrangement in accordance with the invention having M=1 and N=4, for a "nested" embodiment of an arrangement in accordance with the invention having M=1 and N=4, and for three arrangements known from the prior art. Curve (a) in FIG. 6 shows the theoretical optimum, known as Matched Filter Bound, that can be attained by means of a so-called Maximum Likelihood Sequence Estimator (MLSE). Curve (b) shows the optimum bit error rate (BER) attainable by means of a Decision feedback Equalizer (DFE). Curve (c) shows the bit error rate (BER) resulting from using an arrangement according to the prior art having M=N=L=12, in which the first decision circuit ID comprises a DFE dimensioned to reach the bit error rate of curve (b). This curve (c) likewise applies to an arrangement in accordance with the invention in which the first decision circuit ID comprises the same DFE, but in which M and N are reduced to M=1 and N=4, respectively. This clearly proves that these reductions can be allowed without any notable degradation of the attainable transmission quality. Finally, curve (d) shows the bit error rate (BER) resulting from using the once "nested" version of the arrangement in accordance with the invention having M=1 and N=4, the same values as used for curve (c). This "nesting" once is symbolically indicated by ((M=1, N=4)) for curve (d) in FIG. 6. A comparison of the curves (c) and (d) shows that "nesting" can actually lead to a further improvement of the realized transmission quality. In the example under discussion it appears that multiple "nesting" does not cause any appreciable further improvement of the transmission quality.

What is claimed is:

1. An apparatus for combatting intersymbol interference and noise introduced into a transmitted data signal transmitted at a symbol rate 1/T by a transmission channel having a memory span LT corresponding to a number L of consecutive data symbols, which apparatus comprises:
   a. a receive filter for forming a delayed version of the transmitted data signal and for suppressing noise therein, and having an output at which a delayed and filtered version of the transmitted data signal is provided;
   b. a first decision circuit for forming a preliminary symbol signal, representing preliminary symbol decisions, in response to the transmitted data signal;
   c. a second decision circuit for forming a final symbol decision signal representing final symbol decisions, and having an input for receiving an input signal;
   d. compensating means comprising:
      i. a feedforward section for forming a first compensating signal for pre-cursive intersymbol interference in response to a number of consecutive preliminary symbol decisions, the feedforward section having a memory span MT corresponding to a number M of preliminary symbol decisions, which number M is smaller than L; and
      ii. a feedback section for forming a second compensating signal for post-cursive intersymbol interference in response to a number of consecutive final symbol decisions; the compensating means acting in combination with the receive filter to minimize a predetermined function of a difference between the input signal of the second decision circuit and the final symbol decision signal; and
   e. a combining circuit for forming the input signal for the second decision circuit from the delayed and filtered version of the transmitted data signal and a sum of the first and second compensating signals.

2. An apparatus as claimed in claim 1, wherein the feedback section of the compensating means has a memory span NT corresponding to a number N of final symbol decisions which number N is smaller than L.

3. An apparatus as claimed in claim 1 or 2, wherein the feedforward section comprises a table-lookup memory for producing the first compensating signal.

4. An apparatus as claimed in claim 1 or 2, wherein the feedback section comprises a table-lookup memory for producing the second compensating signal.

5. An apparatus as claimed in claim 1 or 2, wherein the feedforward section and the feedback section jointly comprise a table-lookup memory for producing the sum of the first and second compensating signals.

6. An apparatus as claimed in claim 1 or 2, further comprising:
   means for generating an error signal representative of the difference between the input signal of the second decision circuit and the final symbol decision signal; and wherein
   the compensating means is adaptively adjustable under control of the error signal.

7. An apparatus as claimed in claim 6, wherein the receive filter is adaptively adjustable under control of the error signal.

8. An apparatus as claimed in claim 1 or 2, wherein the first decision circuit comprises:
   a. a second receive filter for forming a delayed version of the transmitted data signal and for suppressing noise therein, and having an output at which a second delayed and filtered version of the transmitted data signal is provided;
   b. a second first decision circuit for forming a second preliminary symbol signal representing second preliminary symbol decisions in response to the transmitted data signal;

c. a second second decision circuit for forming a second final symbol decision signal representing second final symbol decisions, and having an input for receiving an input signal, wherein the second final symbol decisions constitute the preliminary symbol decisions for the first decision circuit;

d. second compensating means comprising:
  i. a second feedforward section for forming a second first compensating signal for pre-cursive intersymbol interference in response to a number of consecutive second preliminary symbol decisions, the second feedforward section having a memory span M'T corresponding to a number M' of second preliminary symbol decisions, which number M' is smaller than L; and
  ii. a second feedback section for forming a second second compensating signal for post-cursive intersymbol interference in response to a number of consecutive second final symbol decisions;

the second compensating means acting in combination with the second receive filter to minimize a predetermined function of a second difference between the input signal of the second second decision circuit and the second final symbol decision signal; and e. a second combining circuit for forming the input signal for the second second decision circuit from the second delayed and filtered version of the transmitted data signal and a sum of the second first and second second compensating signals.

9. An apparatus as claimed in claim 1 or 2, wherein the first decision circuit comprises:

a. a second first decision circuit for forming a second preliminary symbol signal representing second preliminary symbol decisions in response to the transmitted data signal;

b. a second second decision circuit for forming a second final symbol decision signal representing second final symbol decisions, and having an input for receiving an input signal wherein the second final symbol decisions constitute the preliminary symbol decisions for the first decision circuit;

c. second compensating means comprising:
  i. a second feedforward section for forming a second first compensating signal for pre-cursive intersymbol interference in response to a number of consecutive second preliminary symbol decisions, the second feedforward section having a memory span M'T corresponding to a number M' of second preliminary symbol decisions, which number M' is smaller than L; and
  ii. a second feedback section for forming a second second compensating signal for post-cursive intersymbol interference in response to a number of consecutive second final symbol decisions;

the second compensating means acting in combination with the second receive filter to minimize a predetermined function of a second difference between the input signal of the second second decision circuit and the second final symbol decision signal; and e. a second combining circuit for forming the input signal for the second second decision circuit from the second delayed and filtered version of the transmitted data signal and a sum of the second first and second second compensating signals.

10. An apparatus as claimed in claim 1 or 2, further comprising:

a. switching means for, in a first position, selectably coupling an input of the feedforward section to an output of the first decision circuit and, in a second position, to an output of the feedback circuit; and wherein b. during each symbol interval T the feedforward section, the feedback section, the combining circuit, and the second decision circuit are first used for obtaining second preliminary symbol decisions and are subsequently used for obtaining the final symbol decisions based on the second preliminary symbol decisions.

* * * * *